Patented Mar. 7, 1950

2,499,551

UNITED STATES PATENT OFFICE 2,499,551

HYDRAULIC PRESSURE TRANSMITTING FLUID

Chester M. White, Rochester, N. Y., assignor to Genesee Research Corporation, Rochester, N. Y., a corporation of New York No Drawing. Application February 7, 1947, Serial No. 727,271

8 Claims. (Cl. 252—73)

The present invention relates to a new and improved hydraulic pressure transmitting fluid which, while not limited thereto, is particularly adapted for use as a hydraulic medium in hydraulic brake systems, hydraulic shock absorbers, hydraulic presses, and other fluid pressure actuated mechanisms.

In spite of extended research in an effort to develop substitutes, castor oil is today the most commonly employed "base" or lubricant in hydraulic pressure transmitting fluids. Possibly the greatest drawback and disadvantage attending the use of castor oil for this purpose is its tendency to oxidize and form a thick, tacky film on the moving parts of the hydraulic pressure system in which it is employed. An almost equally serious disadvantage of castor oil "base" fluids is their comparatively low water tolerance. Straight castor oil fluids may be separated into phases due to the presence of water of condensation.

The foregoing and other disadvantages of castor oil are obviated by the present invention and while, in one sense, the invention may be said to encompass hydraulic pressure transmitting fluids in which a new class of materials is substituted for castor oil, it is not to be construed in such a narrow sense. The compositions of the invention are preferably free from castor oil, but, when necessary, they may be readily mixed with commercial castor oil or other "base" fluids in common use in hydraulic systems today.

According to the invention, the improved hydraulic fluids contain one or more polymerized alkylene glycols. These polymerized alkylene glycols should have average molecular weights ranging from about 130 to about 420. While it is possible to employ a polymerized alkylene glycol, or a mixture of polymerized alkylene glycols per se, it is in most cases desirable and preferable to dilute the polymer with a diluent or solvent.

In its more specific aspects, the invention contemplates the use of polymerized lower alkylene glycols of varying molecular weight such as polymerized ethylene glycols and polymerized propylene glycols. Particularly suitable are the following polymers having the physical constants indicated:

As diluents or solvents, alcohol ethers are preferred. Illustrative of these alcohol ether diluents or solvents may be mentioned the methyl, ethyl, propyl, butyl, etc. ethers of ethylene glycol, diethylene glycol, triethylene glycol, tetraethylene glycol, propylene glycol, dipropylene glycol, tripropylene glycol and tetrapropylene glycol. Preferably, mixtures of the foregoing alcohol ethers are employed.

As employed herein the term "polymerized alkylene glycol" denotes a mixture of polymers formed by subjecting two or more molecules of a particular alkylene glycol to polymerization. Accordingly, the polymerized alkylene glycols contemplated, not being definite chemical compounds but mixtures of compounds formed in the polymerization process, must be identified by average molecular weights.

The "alcohol ether" diluents or solvents, on the other hand, are not polymerized alkylene glycols coming within the foregoing category, but are definite and specific alkyl ethers of a polyoxyalkylene glycol of definite molecular weight. A "polyglycol" ether diluent, furthermore, is not, as pointed out, a "polymerized alkylene glycol," but a definite and specific chemical compound of definite molecular weight. When mixtures of alcohol ethers are employed as diluents, the mixture is one made up of definite, singly preformed compounds having a definite percentage of identifiable ethers.

Preferred relative proportions of mixed polymerized alkylene glycols and diluent depend generally upon the molecular weight of the polymer employed. Generally speaking, considering a mixture of polymerized ethylene glycol and polymerized propylene glycol, for example, the higher the molecular weight of the former, the smaller the amount is employed when compared with the amount of the latter. Also, when some of the higher polymers are employed, it may be expedient to add a little water, in which case the inclusion of conventional corrosion inhibitors is indicated and desirable. The foregoing general remarks concerning proportions will be more readily understood and appreciated as the description proceeds and as specific examples are disclosed.

When a polymerized ethylene glycol having an

|  | Polymerized Ethylene Glycols | | | Polymerized Propylene Glycols | |
| --- | --- | --- | --- | --- | --- |
|  | 200 | 300 | 400 | 150 | 134 |
| Av. Mol. Wt. | 190–200 | 285–315 | 380–420 | 150 | 134 |
| Visc. @ 210° F. in S. U. V. | 38–41 | 42–46 | 45–55 | 37 |  |
| Freezing Range, °C | Supercools | −15 to 8 | 4 to 10 | −68 |  |
| Flash Point, °F | 350 | 385 | 435 | 240 | 280 |
| Spec. Grav. 20/20° C | 1.12 | 1.13 | 1.13 | 1.02 to 1.03 | 1.025 | average molecular weight of 200 is employed, the following general formulation, having the range of ingredient proportions indicated, embraces a number of highly desirable fluids for use in hydraulic brake systems:

| | Per cent |
|---|---|
| Polymerized ethylene glycol (average molecular weight 200) | 1–50 |
| Polymerized propylene glycol (average molecular weight 134) | 30–99 |
| Aliphatic ethers of polyglycols | 0–69 |

In this formula, up to 50% of the polymerized propylene glycol concentration may be substituted by a so-called "higher glycol," such as butylene, amylene or hexylene glycol.

Falling specifically under the foregoing general formulation is the following specific example:

| | Per cent |
|---|---|
| Polymerized ethylene glycol (average molecular weight 200) | 20 |
| Polymerized propylene glycol (average molecular weight 134) | 40 |
| Mixture of aliphatic alcohol ethers of triethylene glycol and higher glycols | 40 |

In order to reduce corrosion, it is desirable to add 0.05% diamylamine phosphate and/or 0.05% diisopropylamine nitrite to the above formula.

In order to illustrate the desirability of the foregoing specific brake fluid formation, its critical physical data is given below:

Boiling point, 208° C.
Flash point, 245° F.
Fire point, 265° F.
Rubber swelling, 0.003″ (heated 5 days at 70° C.)
Non-volatile, 37.0% (heated 2 days at 200° F.)
Viscosity at 100° F., 70 S. U. V. (13.12 c. s.)
Viscosity at −40° F., 5,716 c. s.
Pour point, −60° F.

Exemplary of a brake fluid composition wherein part of the polymerized propylene glycol concentration is substituted by a higher glycol is the following specific formula:

| | Per cent |
|---|---|
| Polymerized ethylene glycol (average molecular weight 200) | 18.00 |
| Polymerized propylene glycol (average molecular weight 134) | 24.90 |
| Hexylene glycol | 15.00 |
| Mixture of aliphatic alcohol ethers of triethylene glycol and higher glycols | 42.00 |
| Diamylamine phosphate | 0.05 |
| Diisopropylamine nitrite | 0.05 |

The composition of the foregoing formula possesses the following physical constants:

Viscosity at 100° F.___ 10.4 c. s.
Viscosity at −40° F.___ 5,950 c. s.
Boiling point_____ 390° F.
Flash point_____ 170° F.
Rubber swelling (5 days at 158° F.)___ 0.008″
Corrosion (5 days at 158° F.):
   Aluminum alloy_ Nil
   Cast iron_____ Nil
   Steel_____ Nil
   Brass_____ Nil
   Copper_____ Slight stain
   Tin coated iron__ Nil
Cold Test_____ Flows at −60° F.
Water tolerance_____ Clear on dilution with water—5% water remains homogeneous at −60° F.
Miscibility _____ Complete with castor oil, glycerine, glucose, and synthetic When a polymerized ethylene glycol with an average molecular weight of 300 is used, it is necessary to add a small percentage of water, not exceeding six per cent, to prevent crystallization of the glycol at low temperature (about −50° C.). Also, it is advisable not to employ the full qantity of polymerized ethylene glycol (20%) employed in the foregoing specific formula using polymerized ethylene glycol of average molecular weight of 200, but, instead, to reduce this amount to 10% and increase the amount of polymerized propylene glycol by a similar amount. Furthermore, this will help to reduce crystal formation at low temperature.

A general formulation employing polymerized ethylene glycol with an average molecular weight of 300 is as follows:

| | Per cent |
|---|---|
| Polymerized ethylene glycol (average molecular weight 300) | 5–15 |
| Polymerized propylene glycol (average molecular weight 134) | 30 |
| Polymerized propylene glycol (average molecular weight 150) | 15–5 |
| Alcohol ether of glycol or polyglycol | 48–44 |
| Water | 2–6 |

Falling specifically under the foregoing general formulation, the following specific formula is found to be particularly efficient in hydraulic brake use:

| | Per cent |
|---|---|
| Polymerized ethylene glycol (average molecular weight 300) | 10.3 |
| Polymerized propylene glycol (average molecular weight 134) | 30.0 |
| Polymerized propylene glycol (average molecular weight 150) | 10.0 |
| Carbitol | 46.7 |
| Water | 3.0 |

This fluid will remain free from crystallization for several days at −60° C. Also, it is completely miscible with castor oil fluids. No separation into phases takes place after the fluid is held at −40° C. for 24 hours.

If a more highly polymerized ethylene glycol with a molecular weight of 400 is employed, then an even higher percentage of water is required to prevent crystallization at about −45° C. It has been found that a maximum of 14% water will be sufficient when a maximum of 10% polymerized ethylene glycol is employed. Here, again, it is advisable to reduce the percentage of polymerized ethylene glycol and replace it with an equal quantity of polymerized propylene glycols.

A general formulation employing polymerized ethylene glycol with an average molecular weight of 400 is as follows:

| | Per cent |
|---|---|
| Polymerized ethylene glycol (average molecular weight 400) | 4–10 |
| Polymerized propylene glycol (average molecular weight 150) | 15–10 |
| Polymerized propylene glycol (average molecular weight 134) | 30 |
| Alcohol ether of glycol or polyglycol | 44–36 |
| Water | 6–14 |

Falling specifically under the foregoing general formulation, the following specific formula is found to be particularly efficient in hydraulic brake use:

| Ingredient | Per cent |
|---|---|
| Polymerized ethylene glycol (average molecular weight 400) | 10.0 |
| Polymerized propylene glycol (average molecular weight 150) | 10.0 |
| Polymerized propylene glycol (average molecular weight 134) | 30.0 |
| Butyl ether of propylene glycol | 38.0 |
| Water | 12.0 |

This fluid will remain practically clear and free from crystallization for several days at −60° C. Also, it is completely miscible with castor oil fluids. No separation into phases takes place after the fluid is held at −40 C. for 24 hours.

As stated, the principal advantage of the pressure transmission fluids of the present invention is that there is no possibility of their oxidizing and forming a thick, tacky film on the moving parts of the hydraulic system. In testing the fluids for such tackiness, the following procedure was employed:

A complete wheel cylinder was assembled by lubricating the walls of the wheel cylinder, pistons, springs, and rubber cups with the fluid under test. 5 cc. of the fluid was added to the cylinder with one port open. The cylinder was held at 70° C. for 14 days in a constant temperature oven. Examination of the cylinder and parts at the end of the test shows no residue, gum or corrosion of any of the parts, indicating that there was no oxidation of the ingredients.

A further advantage of the fluids of the present invention resides in their miscibility with other commercial fluids in common use in brake systems today. They also have good low temperature characteristics and are unusually inert as far as rubber swelling is concerned. As a matter of fact, they do not swell rubber at all. In test conditions the diameter of a rubber brake cup is increased by such a small amount that it is difficult to measure the change with a micrometer. For al practical purposes it is zero within experimental error.

The fluids have good water tolerance, being miscible with water in all proportions. Corrosion of the various metals in the hydraulic system can be held under control by means of suitable inhibitors. Viscosities at 100° F. and at −40° F. establish a curve with a satisfactory slope.

What is claimed is:

1. A hydraulic pressure fluid consisting essentially of a mixture of 1%–50% of a polymerized ethylene glycol having an average molecular weight between 190 and 420, and 30%–99% polymerized propylene glycol having an average molecular weight between 130 and 150.

2. A hydraulic pressure fluid consisting essentially of a lubricating base consisting of a mixture of 1%–50% of a polymerized ethylene glycol having an average molecular weight between 190 and 420, 30%–99% of a polymerized propylene glycol having an average molecular weight between 130 and 150, and 0%–69% of a lower alkyl ether of a glycol as a diluent.

3. A hydraulic pressure fluid comprising the following ingredients in the approximate percentages indicated:

| Ingredient | Per cent |
|---|---|
| Polymerized ethylene glycol (average molecular weight 200) | 1–50 |
| Polymerized propylene glycol (average molecular weight 134) | 30–99 |
| Aliphatic ethers of glycols | 0–69 |

4. A hydraulic pressure fluid comprising the following ingredients in the approximate percentages indicated:

| Ingredient | Per cent |
|---|---|
| Polymerized ethylene glycol (average molecular weight 200) | 20 |
| Polymerized propylene glycol (average molecular weight 134.2) | 40 |
| Mixture of aliphatic alcohol ethers of glycols | 40 |

5. A hydraulic pressure fluid comprising the following ingredients in the approximate percentages indicated:

| Ingredient | Per cent |
|---|---|
| Polymerized ethylene glycol (average molecular weight 300) | 5–15 |
| Polymerized propylene glycol (average molecular weight 134) | 30 |
| Polymerized propylene glycol (average molecular weight 150) | 15–5 |
| Alcohol ether of a glycol | 48–44 |
| Water | 2–6 |

6. A hydraulic pressure fluid comprising the following ingredients in the approximate percentages indicated:

| Ingredient | Per cent |
|---|---|
| Polymerized ethylene glycol (average molecular weight 300) | 10.3 |
| Polymerized propylene glycol (average molecular weight 134) | 30.0 |
| Polymerized propylene glycol (average molecular weight 150) | 10.0 |
| Ethyl ether of diethylene glycol | 46.7 |
| Water | 3.0 |

7. A hydraulic pressure fluid comprising the following ingredients in the approximate percentages indicated:

| Ingredient | Per cent |
|---|---|
| Polymerized ethylene glycol (average molecular weight 400) | 4–10 |
| Polymerized propylene glycol (average molecular weight 150) | 15–10 |
| Polymerized propylene glycol (average molecular weight 134) | 30 |
| Alcohol ether of a glycol | 44–36 |
| Water | 6–14 |

8. A hydraulic pressure fluid comprising the following ingredients in the approximate percentages indicated:

| Ingredient | Per cent |
|---|---|
| Polymerized ethylene glycol (average molecular weight 400) | 10.0 |
| Polymerized propylene glycol (average molecular weight 150) | 10.0 |
| Polymerized propylene glycol (average molecular weight 134) | 30.0 |
| Butyl ether of propylene glycol | 38.0 |
| Water | 12.0 |

CHESTER M. WHITE.

REFERENCES CITED

The following references are of record in the file of this patent:

UNITED STATES PATENTS

| Number | Name | Date |
|---|---|---|
| 1,898,564 | Muench et al. | Feb. 21, 1933 |
| 1,970,578 | Schoeller et al. | Aug. 21, 1934 |
| 2,169,231 | Fife | Aug. 15, 1939 |
| 2,200,495 | Fife | May 14, 1940 |
| 2,425,845 | Toussaint et al. | Aug. 19, 1947 |

OTHER REFERENCES

"Synthetic Organic Chemicals," Carbide and Carbon Chemicals Corporation publication, 12th edition, July 1, 1945, pages 18–22 inclusive.